Sept. 3, 1929.  C. P. KLEIN  1,726,989
OILING RACK
Filed Aug. 6, 1926
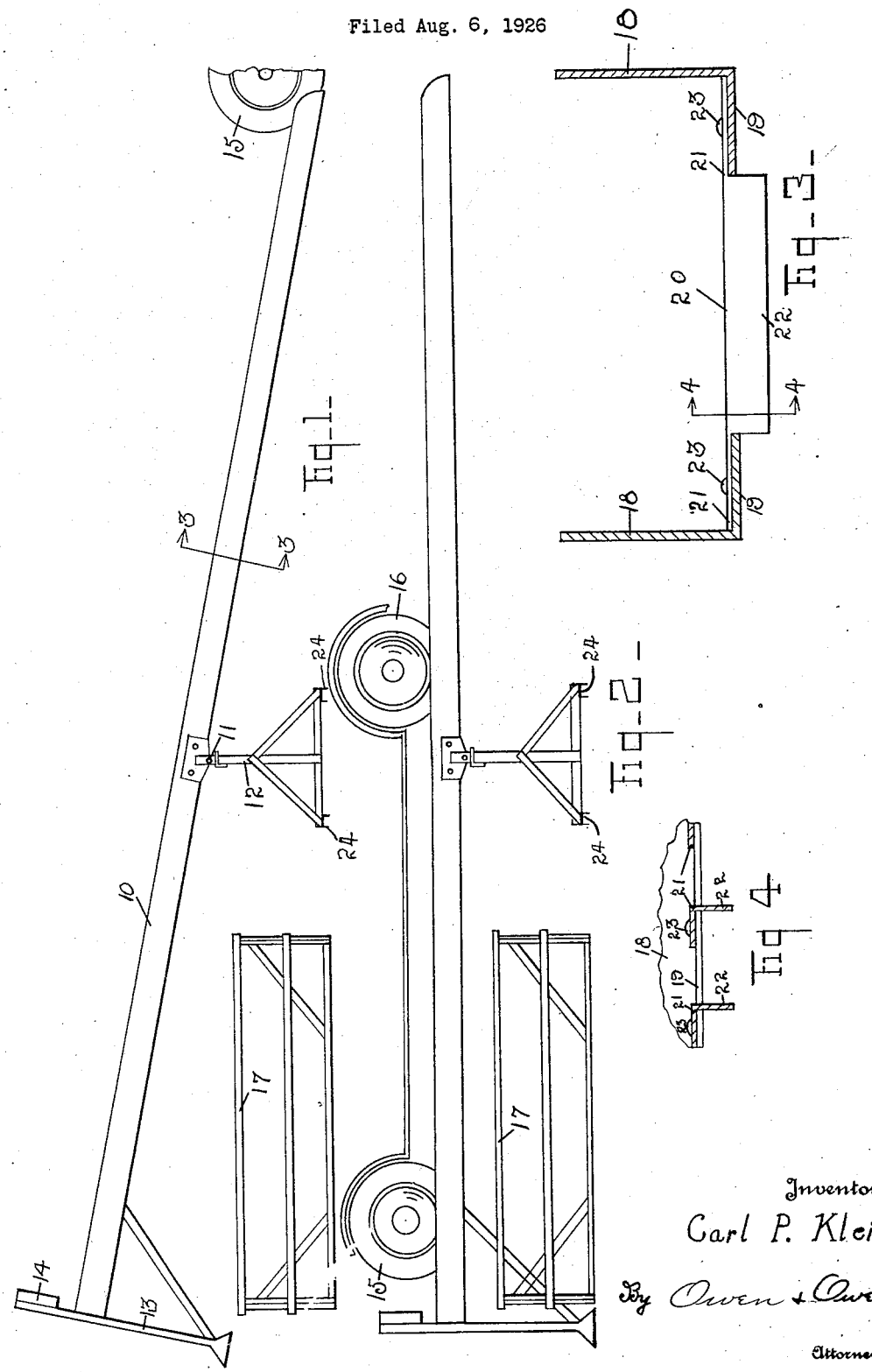
Inventor
Carl P. Klein
By Owen & Owen
Attorneys.

Patented Sept. 3, 1929.

1,726,989

UNITED STATES PATENT OFFICE.

CARL P. KLEIN, OF BELLEVUE, OHIO, ASSIGNOR TO THE KLEIN STRUCTURAL STEEL COMPANY, OF BELLEVUE, OHIO, A CORPORATION.

OILING RACK.

Application filed August 6, 1926. Serial No. 127,576.

This invention relates to oiling racks upon which automobiles, trucks, etc., may be mounted for purposes of oiling and for other purposes where accessibility of the under portion of the vehicles is desired. The purpose of the invention is to provide a rack of the character described, which will be economical of space, which may be readily mounted wherever desired, which will not retain dirt, and upon which vehicle wheels will not slip. Minor details of the apparatus will appear as the description proceeds.

In the accompanying drawings forming a part of this specification, Figure 1 is a side elevation of apparatus embodying my invention; Fig. 2 is a view similar to Fig. 1, showing the apparatus in a different position; Fig. 3 is a section on the line 3—3 of Fig. 1; Fig. 4 is a section on the line 4—4 of Fig. 3.

The embodiment of my invention illustrated in the drawings comprises two parallel troughs 10 pivoted at 11 upon a frame 12. The troughs extend farther from the pivot on one side than they do on the other. At the short end of the trough there is provided a leg 13 which will support that end of the trough at a height substantially equal to the central part. Leg 13 is extended upward and has attached thereto a stop 14.

In its idle position, shown in Fig. 1, the long end of the trough rests upon the ground. When the apparatus is used, a vehicle is run up the trough until its center of gravity passes the pivotal support of the trough. When this occurs the apparatus turns on its pivot and brings the leg 13 down to the ground. As a usual thing, the driver of the vehicle instinctively applies the brakes immediately when the tilting begins, so that the vehicle is stopped considerably before the front wheel 15 reaches the stop 14, and before the rear wheel 16 has reached the pivotal point of the apparatus; but in case of unusual carelessness on the part of the driver, stop 14 prevents the vehicle from running off of the end of the apparatus.

Step 17 may be located in a convenient position to descend from or mount to the vehicle when it is in position upon the rack.

It will be understood that two troughs are used mounted at spaced points upon frame 12. As the two troughs are identical, the construction of only one is shown in detail. As shown in Fig. 3, the trough is formed of two angle irons having their longer webs 18 parallel and vertical, and their narrower webs 19 horizontal and projecting towards each other. The bottom of the trough is formed of angle irons 20, each of which has the ends of its horizontal web 21 lying upon webs 19, while the ends of its vertical web 22 are cut away, so that web 22 extends downward between webs 19. Angle irons 20 may be secured to webs 19 by means of rivets 23, or in any other suitable manner. As shown in Fig. 4, angle irons 20 are spaced apart, so as to form a grid.

It will be readily understood that any grease, snow, dirt or other débris which may be deposited in the trough is speedily crowded out between the bars at the bottom of the trough by the vehicle wheels traveling thereover. Also, the spaces between the bars furnish a good grip for the vehicle wheels, so that there is no danger of the vehicle sliding down the trough, however thoroughly the surfaces of individual bars may be greased or coated with ice.

It will be readily seen that I have provided an oiling rack which requires but very little space, which is economical to manufacture, which may be readily kept clean, and upon which the wheels of a vehicle are not likely to slip.

In the construction shown, central support 12 is mounted upon channel irons 24, which are arranged with their channels downward. This aids in preventing longitudinal movement of the apparatus under impact from vehicles, being especially effective when the apparatus is used out of doors, or on surfaces into which the webs of the channel iron may sink. Even when used upon concrete or other unyielding surfaces, the webs of the channel irons cut through grease or dirt upon such surfaces and, therefore, do not slide objectionably.

Various modifications may be made in the disclosed construction, within the scope of the appended claim.

What I claim is:

In an oiling rack for automobiles, a trough up which the wheels of the automobile may run, said trough comprising spaced angle irons having vertical webs parallel and having horizontal webs projecting towards each other, and spaced cross pieces attached to the horizontal webs, said cross pieces being composed of angle irons having their horizontal webs resting upon the horizontal webs of the first said angle irons and their vertical webs cut away at their ends and projecting down between the horizontal webs of the first said angle irons.

In testimony whereof, I have hereunto signed my name to this specification.

CARL P. KLEIN.